(12) United States Patent
Johansson et al.

(10) Patent No.: US 8,538,261 B2
(45) Date of Patent: *Sep. 17, 2013

(54) IMMEDIATE PROTECTION SCHEME FOR PASSIVE OPTICAL NETWORK

(75) Inventors: Albin Johansson, Skelleftea (SE); Elmar Trojer, San Jose, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 244 days.

This patent is subject to a terminal disclaimer.

(21) Appl. No.: 12/920,137

(22) PCT Filed: Mar. 17, 2008

(86) PCT No.: PCT/SE2008/050295
§ 371 (c)(1),
(2), (4) Date: Oct. 27, 2010

(87) PCT Pub. No.: WO2009/116904
PCT Pub. Date: Sep. 24, 2009

(65) Prior Publication Data
US 2011/0038629 A1 Feb. 17, 2011

(51) Int. Cl.
*H04B 10/20* (2011.01)
(52) U.S. Cl.
USPC ......... 398/58; 398/63; 398/2; 398/10; 398/17
(58) Field of Classification Search
USPC ............... 398/1–5, 10–15, 17–20, 30, 32, 58, 398/63, 66, 67
See application file for complete search history.

(56) References Cited

U.S. PATENT DOCUMENTS

| | | | | |
|---|---|---|---|---|
| 5,357,360 A | * | 10/1994 | Imhoff et al. | 398/100 |
| 7,609,967 B2 | * | 10/2009 | Hochbaum et al. | 398/67 |
| 7,835,268 B2 | * | 11/2010 | Tanaka | 370/216 |
| 8,081,877 B2 | * | 12/2011 | Duan et al. | 398/98 |
| 8,145,057 B2 | * | 3/2012 | Costa et al. | 398/67 |
| 8,331,784 B2 | * | 12/2012 | Mizutani et al. | 398/70 |
| 2002/0030865 A1 | * | 3/2002 | Kawate et al. | 359/110 |
| 2002/0071149 A1 | * | 6/2002 | Xu et al. | 359/110 |
| 2002/0109876 A1 | * | 8/2002 | Eijk et al. | 359/110 |
| 2005/0147409 A1 | * | 7/2005 | Colven et al. | 398/5 |
| 2008/0056720 A1 | * | 3/2008 | Sitton et al. | 398/98 |

(Continued)

OTHER PUBLICATIONS

Tanaka, K., et al,: "1:N OLT Redundant Protection Architecture in Ethernet PON System", Optical Fiber communication/National Fiber Optic Engineers Conference, 2008. OFC/NFOEC 2008. IEEE, Piscataway, NJ, USA, Feb. 24, 2008, ISBN 978-1-55752-856-8.

*Primary Examiner* — Daniel Washburn
*Assistant Examiner* — Hibret Woldekidan

(57) ABSTRACT

The present invention relates to a method, device and system for fast protection of an optical network system, in particular for a Passive Optical Network (PON), such as a Gigabit-capable Passive Optical Network (GPON). In the method, communication failure between a first optical network device and a first optical line termination device is detected. Switching of functionality from the first optical line termination device to a second optical line termination device is initiated, and a control message is sent from the second optical line termination device to the first optical network device such that the first optical network device is prevented from moving into initial state. Furthermore, the method comprises determining and setting timing settings for the first optical network device.

33 Claims, 14 Drawing Sheets

(56) References Cited

U.S. PATENT DOCUMENTS

| | | | |
|---|---|---|---|
| 2008/0089686 A1* | 4/2008 | Kazawa et al. | 398/71 |
| 2008/0131124 A1* | 6/2008 | Nam et al. | 398/67 |
| 2009/0060496 A1* | 3/2009 | Liu et al. | 398/17 |
| 2009/0162064 A1* | 6/2009 | Mizutani et al. | 398/66 |
| 2009/0245792 A1* | 10/2009 | Oishi et al. | 398/66 |
| 2010/0166419 A1* | 7/2010 | Elmoalem et al. | 398/2 |
| 2010/0226649 A1* | 9/2010 | Cheng et al. | 398/72 |
| 2010/0251097 A1* | 9/2010 | Vincent, III | 715/234 |
| 2010/0310252 A1* | 12/2010 | Healey | 398/6 |
| 2011/0044683 A1* | 2/2011 | Trojer | 398/1 |
| 2011/0317995 A1* | 12/2011 | Zheng | 398/2 |
| 2012/0057865 A1* | 3/2012 | Hasegawa et al. | 398/16 |

* cited by examiner

IMMEDIATE PROTECTION SCHEME FOR PASSIVE OPTICAL NETWORK

TECHNICAL FIELD

The present invention relates to a method and devices for protection of an optical network system, in particular for a Passive Optical Network (PON), such as a Gigabit-capable Passive Optical Network (GPON).

BACKGROUND

In recent years, the requirement for data transfer capacity and reliable networks have increased. Standards, such as ITU-T G984, have been developed in order to increase the speed and accordingly the capacity of optical network systems.

Reliability of communication networks is an increasingly important parameter, and accordingly continuous operation of optical networks in case of breakage of fibers or malfunctioning nodes or devices is desired. The ITU-T G.984 standard specifying GPON includes four different protection switching possibilities in ITU-T G.984.1 (March 2003). These are:

- Fiber duplex system (type-A scheme): Only the trunk fiber is duplex. In case of a feeder fiber break, the spare fiber can be switched in manually. Since the switching should be automated in larger networks, fiber switches are necessary which are costly and render this scheme uneconomical.
- OLT-only duplex system (type-B scheme): Trunk fiber and optical line termination (OLT) line terminal (LT) are duplex. One OLT-LT is in operation, the other is in hot-standby, kicking in if the OLT-LT fails or if the trunk breaks. Optical Network Units (ONU)/Optical Network Terminals (ONT) and drop fibers are simplex. Since only the components that are shared by the users are duplex, the scheme shows a good tradeoff between costs and fault tolerance.
- Full duplex system (type-C scheme): Fully failure tolerant system, since all components are duplex. The whole distribution fiber network has to be doubled, leading to very high costs for this solution.
- Partial duplex system (type-D scheme): With a mix of type-B and type-C protection, simplex and duplex users can be mixed on the PON. The scheme proposed in the standard is unworkable due to the fiber-cross in the splitter.

So far, the interest in protection switching in the GPON community has been limited since typical deployment scenarios support a maximum of 64 split on 20 km reach, i.e. the protection benefits are small compared to the costs of the schemes. However, with the development of reach-extended systems with higher splits (128 to 256) protection will become an essential part of the PON system, since a trunk fiber cut or OLT failure will cause service outage for a high number of users.

Considering a type-B scheme, switch-over based on the standard procedure as proposed in the standard will take several minutes to occur since all ONUs/ONTs move to initial state where a full initialization including activation and ranging is necessary. Thus such schemes cannot recover quickly and connection or session continuity cannot be accomplished.

SUMMARY

Accordingly, it is an object of the present invention to provide a method and devices for minimizing downtime of a PON in case of fiber fault or device failure in the network.

A method for protecting an optical network system is provided. The optical network system comprises a first optical network device, an optical distribution network, and a first and second optical line termination device, wherein the first optical network device communicates or is adapted to communicate with the first optical line termination device on a first connection via the optical distribution network and a first optical fiber trunk connected to the first optical line termination device. Furthermore, the first optical network device has or is adapted to communicate on a second connection to the second optical line termination device via the optical distribution network and a second optical fiber trunk connected to the second optical line termination device. The method comprises detecting communication failure between the first optical network device and the first optical line termination device and initiating switching of functionality from the first optical line termination device to the second optical line termination device. Further, the method comprises sending a control message from the second optical line termination device to the first optical network device such that the first optical network device is prevented from moving into initial state, and determining and setting timing settings for the first optical network device.

It is an important advantage of the present invention that the passive optical network system in case of failure of the first OLT or the first fiber may be brought back into operation in less than 1 millisecond.

Furthermore, an optical line termination device for an optical network system comprising a first optical network device and an optical distribution network is provided. The optical line termination device comprises a fiber trunk interface and is adapted to communicate with the first optical network device on a connection via the optical distribution network and an optical fiber trunk. Further, the optical line termination device comprises a processor device connected to the fiber trunk interface and being adapted to detect communication failure between the first optical network device and another optical line termination device. The optical line termination device is further adapted to initiate switching of functionality from the other optical line termination device to the optical line termination device and adapted to send a control message to the first optical network device such that the first optical network device is prevented from moving into initial state, and adapted to determine and set timing settings for the first optical network device.

It is an important advantage of the present invention that an optical network device is prevented from moving into initial state when the first optical fiber trunk and/or the first optical line termination device fail or break down. Hereby, the downtime of the optical network system is reduced considerably by avoiding complete re-initialization of the optical network devices that are hosted by or connected to the first optical line termination device.

An optical line termination system is provided, comprising a first optical line termination device and a second optical line termination device. The first optical line termination device comprises a first fiber trunk interface and a first core interface, and the second optical line termination device comprises a second fiber trunk interface and a second core interface. Further, the second optical line termination device comprises a second processor device connected to the first fiber trunk interface and being adapted to detect communication failure between a first optical network device and the first optical line termination device, and initiate switching of functionality from the first optical line termination device to the second optical line termination device. Further, the second optical line termination device is adapted to send a control message to the first optical network device such that the first optical network device is prevented from moving into initial state, and adapted to determine and set timing settings for the first optical network device.

Full re-initialization of an optical network system may take several minutes where the optical network is not functioning. The method, device and system according to the invention provide reestablishment e.g. within 50 milliseconds or less, such as within 10 milliseconds.

It is an important advantage of the present invention that session and/or connection continuity is provided or maintained in a PON, such as a GPON, in case of fiber fault of the duplex fiber or failure of duplex network components, such as an OLT.

BRIEF DESCRIPTION OF THE DRAWINGS

The above and other features and advantages of the present invention will become readily apparent to those skilled in the art by the following detailed description thereof, in particular by detailed description of exemplary embodiments thereof with reference to the accompanying drawings, in which.

DETAILED DESCRIPTION

Figure 1:
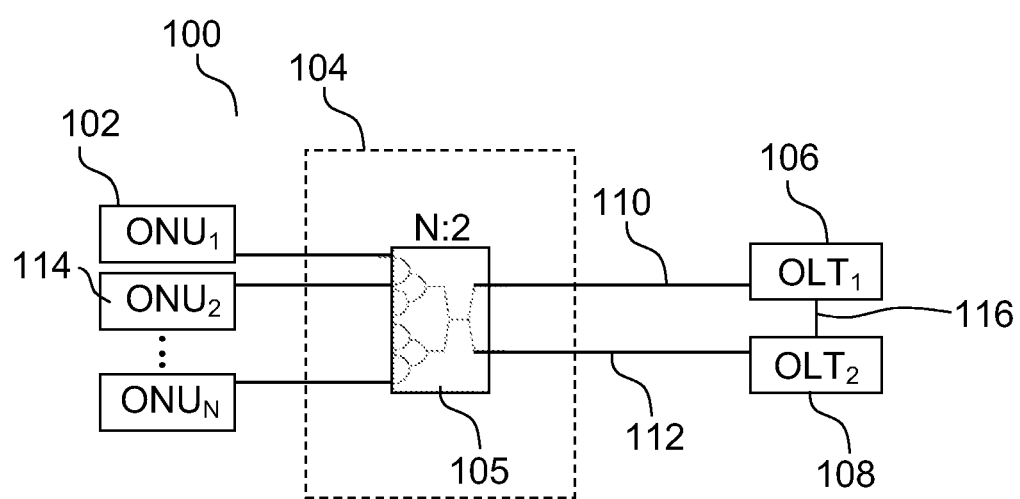
FIG. 1 schematically illustrates an optical network system employing the method and devices according to the present invention, FIG. 2 schematically shows a block diagram of an embodiment of an optical line termination device according to the present invention, FIG. 3 schematically shows a block diagram of another embodiment of an optical line termination device according to the present invention.

The figures are schematic and simplified for clarity, and they merely show details which are essential to the understanding of the invention, while other details have been left out. Throughout, the same reference numerals are used for identical or corresponding parts or features.

FIG. 1 illustrates an optical network system 100 implementing the method according to the present invention. The optical network system operates in a type-B protection scheme scenario as described in ITU-T G.984.1 and comprises a first optical network device ($ONU_1$) 102, an optical distribution network 104 comprising a splitter 105, a first optical line termination device ($OLT_1$) 106 and second optical line termination device ($OLT_2$) 108. The first optical network device 102 communicates with the first optical line termination device 106 on a first connection via the optical distribution network 104 and a first optical fiber trunk 110 connected to the first optical line termination device 106. Furthermore, the first optical network device 102 has a second connection to the second optical line termination device 108 via the optical distribution network 104 and a second optical fiber trunk 112 connected to the second optical line termination device 108. $OLT_1$ communicates with $OLT_2$ on a first control connection 116. The first control connection may be an electrical and/or optical connection. The first control connection may be wireless.

The first optical line termination device 106 and the second optical line termination device 108 are configured in a duplex configuration and hosts or is connected to a number N of optical network devices ($ONU_1$, $ONU_2$, ..., $ONU_N$). Typically, $N=2^p$, where p equals 0, 1, 2, 3, 4, 5, 6, 7, 8, 9, 10 corresponding to N equal to 1, 2, 4, 8, 16, 32, 64, 128, 256, 512, 1024. A higher number of optical network devices may be contemplated.

The splitter 105 comprises N ONU drop ports towards the N optical network devices and two trunk ports connected to $OLT_1$ and $OLT_2$, respectively.

In regular operation of the optical network system 100, $OLT_1$ is active and serves the Optical Network devices $ONU_1$, $ONU_2$, ..., $ONU_N$. The second optical line termination device $OLT_2$ is in hot standby, i.e. listens to upstream traffic on the second connection (second optical fiber trunk 112).

In case $OLT_1$ or the first optical fiber trunk 110 fails, the communication from $OLT_1$ towards $ONU_1$-$ONU_N$ will stop immediately. This will be detected by all active ONUs, which consequently will stop sending towards $OLT_1$ and $OLT_2$ and move into POPUP state. Operation of the Optical Network Unit (ONU) is described in further detail in ITU-T G.984.3 Amendment 1 (July 2005). $OLT_2$ is adapted to detect communication failure between one or more optical network devices and the first optical line termination, e.g. by detecting loss of signal (LOS) on the second optical fiber trunk. In an embodiment, $OLT_2$ detects that a first control signal on the first control connection is missing indicating failure of $OLT_1$ and/or that a second control signal on the first control connection is missing indicating failure of the first optical fiber trunk.

In an embodiment, lost communication from ONUs is interpreted as a failure or fault in $OLT_1$ or in the first optical fiber trunk 110 and switching of functionality from $OLT_1$ to $OLT_2$ is initiated. Upon detection of communication loss from the ONUs, $OLT_2$ sends a control message as soon as possible, e.g. within 50 milliseconds, such as within 20 milliseconds, to a selected $ONU_i$ in order to prevent the selected $ONU_i$ from entering the initial state. The control message may be a directed POPUP message. Bringing ONUs back to operating state from the init state is time consuming since the ONUs loose their configuration and should therefore be avoided. In general, it is important that the ONUs receive the control message before expiry of timer T2 (100 ms). In the method according to the invention, the ONUs are ranged by the second optical line termination device $OLT_2$ and brought back into operation without entering initial state, e.g. by sending directed broadcast messages to the ONUs in the optical network system, thereby saving valuable down time in order to maximize reliability of the optical network system.

Figure 2:
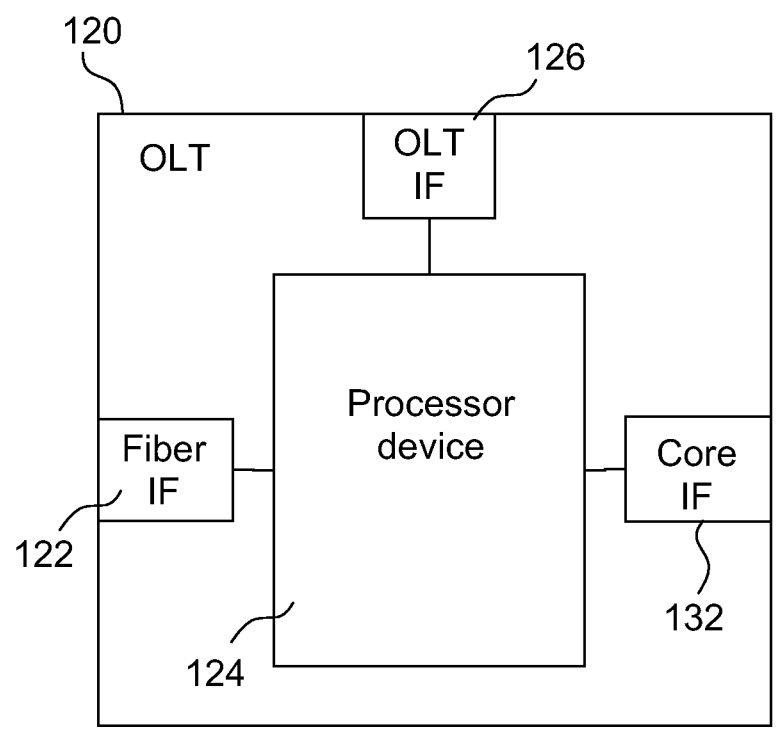

FIG. 2 illustrates an embodiment of the optical line termination device according to the present invention. The optical line termination device 120 comprises a fiber trunk interface 122, a processor device 124, and a first interface 126 for exchanging information with another optical line termination device, e.g. on the first control connection 116. The processor device may comprise a separate memory or data storage (not shown) or share memory with processor devices of other optical line termination devices as described in more detail below. The optical line termination device 120, e.g. implemented in the second optical line termination device 108, is adapted to detect communication failure between one or more of the optical network devices and another optical line termination device, e.g. the first optical line termination device 106. Furthermore, the optical line termination device 120 is adapted to initiate switching of functionality from another optical line termination device, e.g. the first optical line termination device 106, to the optical line termination device 120. Initiation of switching may be based solely on the presence of upstream traffic from one or more ONUs. Alternatively or in combination, initiation of switching may be based on one or more control signals on a control connection, e.g. the first control connection 116 and/or a second control connection, from the first optical line termination device. In an embodiment, no initiation of switching is performed if control signals from $OLT_1$ indicate that the first optical fiber trunk and $OLT_1$ is working.

Further, the optical line termination device 120 is adapted to send a directed POPUP message to the first optical network device and determine and set timing settings for the first optical network device, e.g. as described in connection with FIG. 7 and FIG. 8. Further, the optical line termination device 120 may be adapted to store network data such as round trip delays or other configuration data from another optical line termination device, e.g. $OLT_1$ 106, in a memory in the processor device 124. The memory may be updated continuously, or with a certain frequency, via the first interface 126 and/or a second interface with data from the other or first, optical line termination device in order to facilitate a fast switchover of functionality.

The condition of silence on the second optical fiber trunk may not be sufficient to declare that the other optical line termination device, e.g. $OLT_1$, or the first optical fiber trunk has failed. It is also possible that the optical network system has been put out of operation or that ONUs are just silent for some time. In order to avoid unnecessary switching of functionality, the optical line termination device 120 is adapted to determine the cause of communication failure between the first optical network device and the other optical line termination device and initiate switching of functionality from the other optical line termination device based on the determined cause of communication failure. The cause of communication failure may be determined by reading one or more control signals from the other, i.e. first, optical line termination device on the first control connection. Depending on the control signal(s), switching may be initiated, control message is sent, and timing settings are determined and set accordingly.

Figure 3:
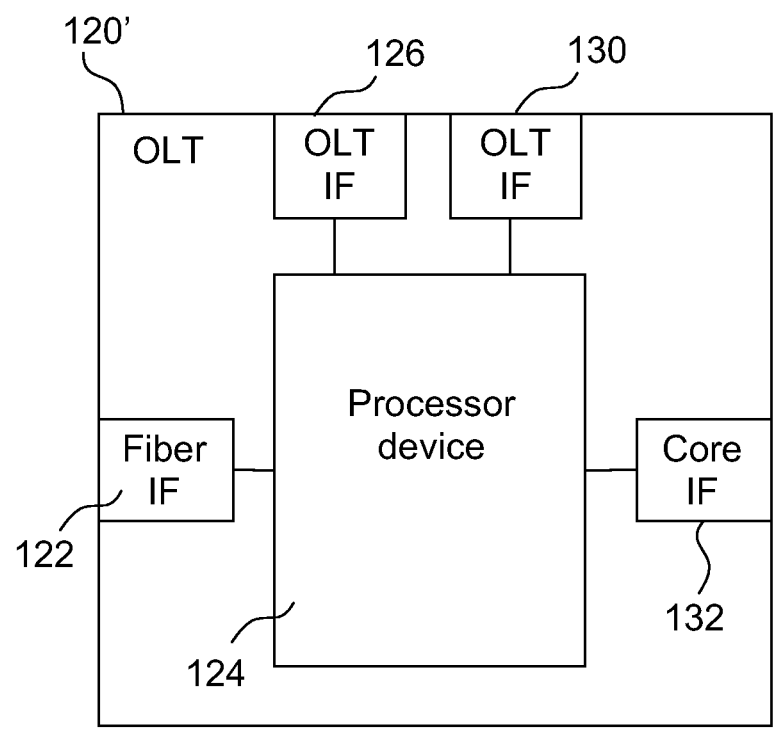

FIG. 3 illustrates an embodiment of the optical line termination device 120' further having a second interface 130 for a second control connection to the other optical line termination device of the duplex configuration. The optical line termination device 120' is adapted to exchange information with the other optical line termination device, e.g. $OLT_1$, via the second interface 130 in case of failure of the first control connection 116.

Figure 4:
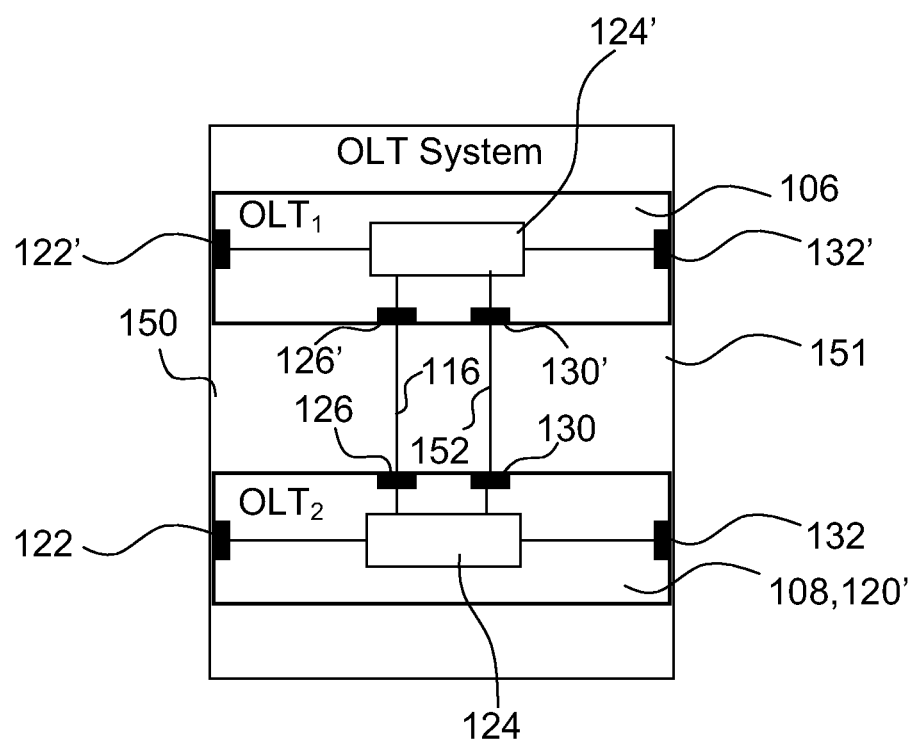
FIGS. 4-8 show different embodiments of an optical line termination system according to the invention, FIG. 9 schematically shows a flow diagram of an embodiment of the method according to the present invention, FIG. 10 schematically shows a flow diagram of an embodiment of the method according to the present invention, and FIGS. 11-14 schematically illustrates a flow diagram of embodiments of selected steps of the method according to the present invention.
Figure 5:
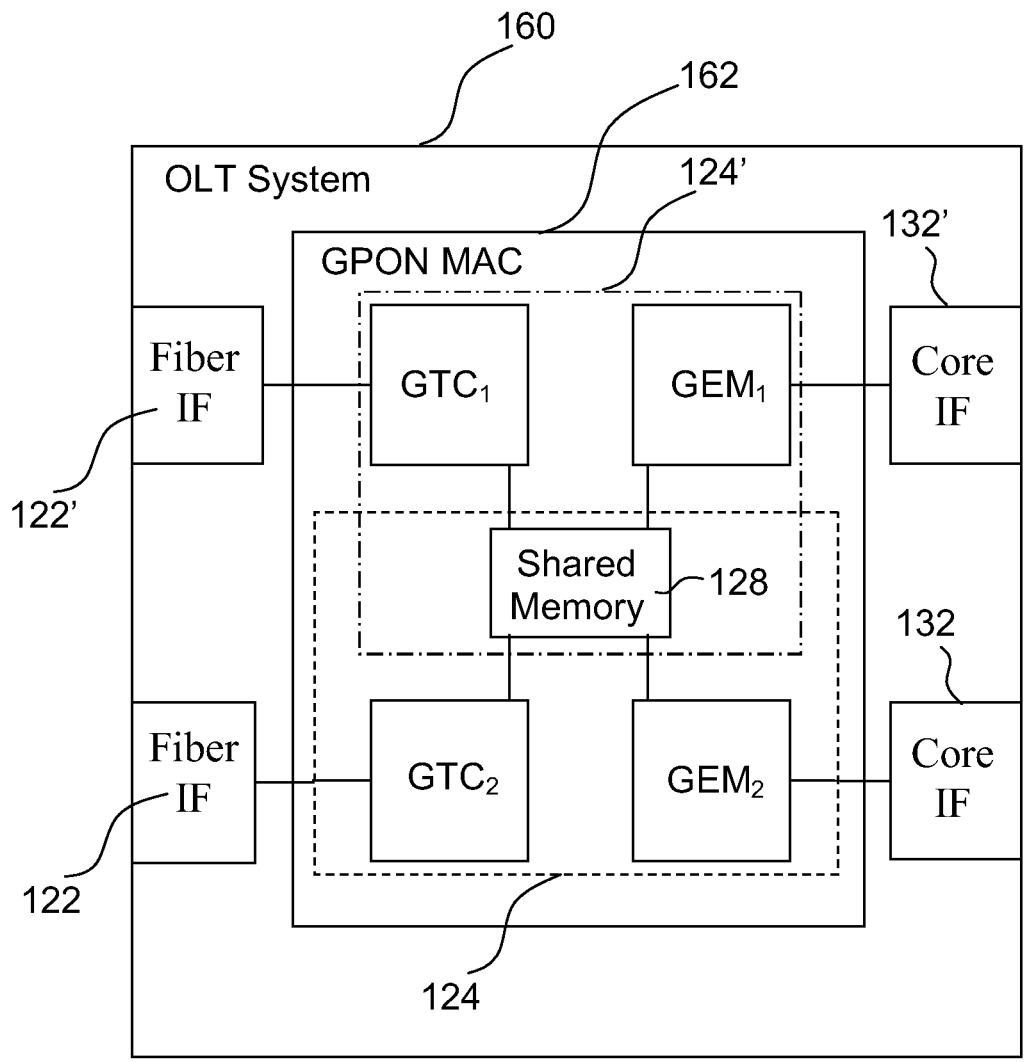

FIG. 4 illustrates an embodiment of an optical line termination system according to the invention. The optical line termination system 150 has a housing 151 comprising a first optical line termination device ($OLT_1$) 106 and a second optical line termination device ($OLT_2$) 120'. The first 106 and second 120' optical line termination devices have first and second fiber trunk interfaces 122' and 122, respectively, first interfaces 126' and 126, respectively, and second interfaces 130' and 130, respectively. The interfaces 126, 126', 130, 130' and corresponding first 116 and second 152 control connections allow $OLT_2$ to determine the cause of communication failure. Further, $OLT_2$ may be adapted to mirror network related data, such as equalization delays, round trip delays, GPON configuration data and/or service definitions, from $OLT_1$ or vice versa, which may be important in order to perform switch over without loosing the communication sessions in the optical network system. In an embodiment of the optical line termination system, $OLT_1$ and $OLT_2$ share memory to facilitate data access. The processor devices 124 and 124' may be implemented in the same or separate silicon boards FIG. 5 illustrates an embodiment of an optical line termination system according to the invention. The optical line termination system 160 comprises a first optical line termination device comprising a first fiber trunk interface 122', a first processor device 124' and a first core interface 132'. Furthermore, the optical line termination system 160 comprises a second optical line termination device comprising a second fiber trunk interface 122, a second processor device 124 and a second core interface 132. In an embodiment of the optical line termination system, the first core interface 132' and the second core interface 132 may be integrated in a single core interface. The first fiber trunk interface 122' and the second fiber trunk interface 122 may comprise GPON optics, e.g. according to ITU-T G.984.2 PMD specification and/or fiber trunk connectors. In the illustrated embodiment, the first processor device 124' and the second processor device 124 are implemented in an Application Specific Integrated Circuit (ASIC) or in a Field-Programmable Gate Array (FPGA) on a silicon board 162, e.g. in a GPON Media Access Control silicon (GPON MAC). The first processor device 124' comprises a first GPON Encapsulation Method block ($GEM_1$) and a first GPON Transmission Convergence block ($GTC_1$), and the second processor device 124 comprises a second GPON Encapsulation Method block ($GEM_2$) and a second GPON Transmission Convergence block ($GTC_2$). The first processor device 124' and the second processor device 124 share memory or data storage 128.

Shared memory and/or control connections for exchanging timing data and other configuration information between the optical line termination devices enable the second optical line termination device to perform switch over without ONUs moving into initial state.

The core interface 132 and/or 132' may be interfacing an Ethernet/IP Packet Processing device. In an embodiment of the optical line termination system, the first core interface 132' and the second core interface 132 may be integrated in a single core interface.

Figure 6:
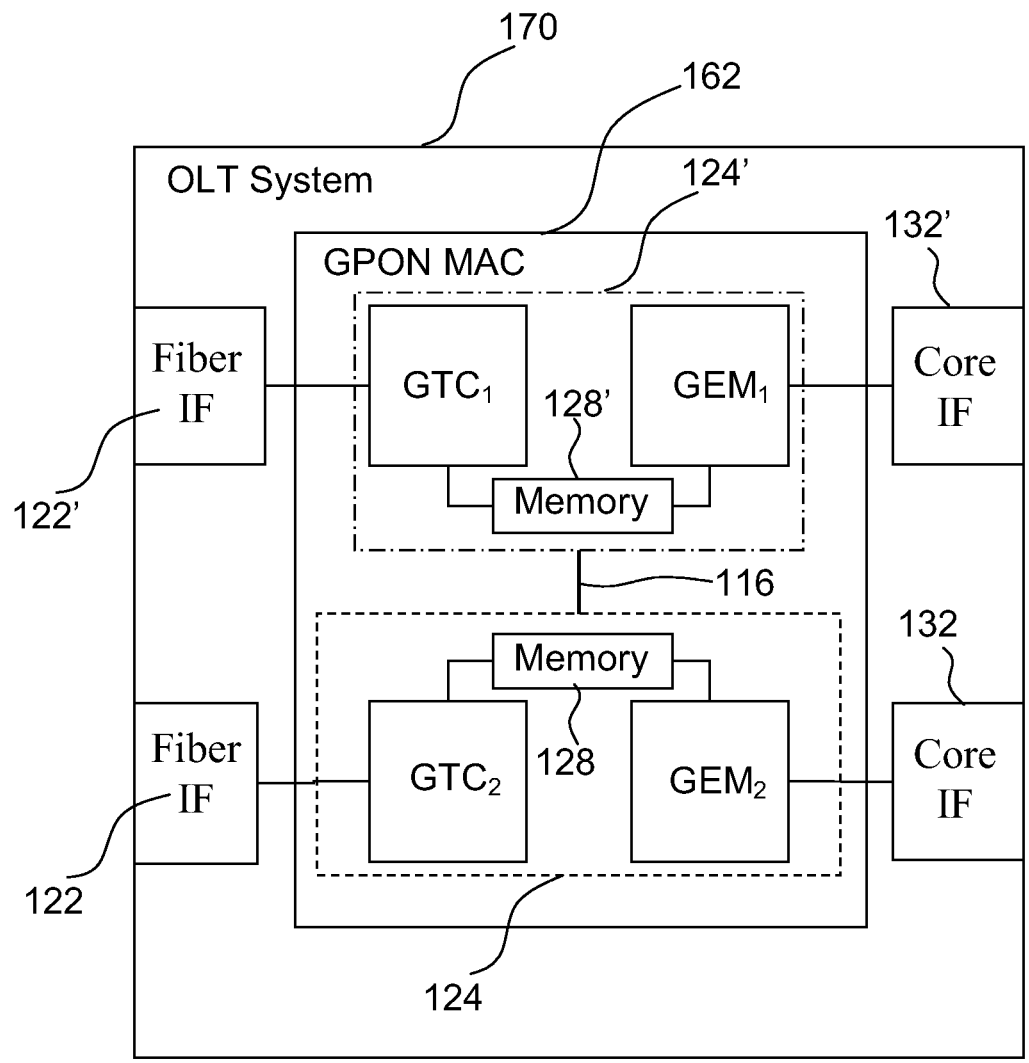

FIG. 6 illustrates an embodiment of an optical line termination system according to the invention. The optical line termination system 170 is similar to the optical line termination system 160 of FIG. 5, except that the first and second optical line termination devices have a separate memory 128' and 128, respectively.

The optical line termination system 170 further comprises a first control connection 116 between the first optical line termination device and the second optical line termination device. Control signals are exchanged in order to be able to determine a cause of communication failure, e.g. a first control signal may indicate proper function of the first optical line termination device and/or a second control signal may indicate proper function of the first optical fiber trunk. The optical line termination system 170 is adapted to mirror network related data, such as equalization delays, round trip delays, GPON configuration data and/or service definitions, between memories 128 and 128'.

Memory of the optical line termination devices, in particular the memory 128 and 128' of FIGS. 5 and 6, may be adapted to hold network related data for the first optical line termination device and/or the second optical line termination device, GPON configuration data and/or service definitions.

The memory 128, 128' may be adapted to hold first optical line termination device equalization delays $EqD_1(n)$ for one or more ONU$_n$ (n=1, 2, . . . , N) and/or second optical line termination device equalization delays EqD$_2$(n) for one or more ONU$_n$ (n=1, 2, . . . , N). Alternatively or in combination, the memory 128, 128' may be adapted to hold first optical line termination device round trip delays RTD$_1$(n) for one or more ONU$_n$ (n=1, 2, . . . , N) and/or second optical line termination device round trip delays RTD$_2$(n) for one or more ONU$_n$ (n=1, 2, . . . , N).

Figure 7:
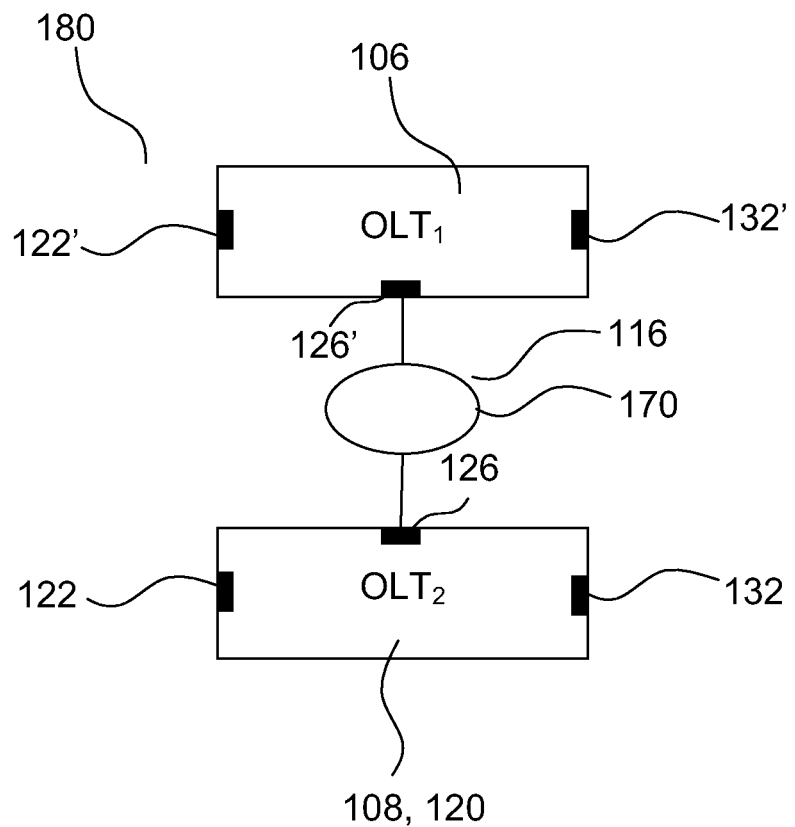

FIG. 7 illustrates a further embodiment of an optical line termination system according to the invention. The optical line termination system 180 comprises a first optical line termination device (OLT$_1$) 106 and a second optical line termination device (OLT$_2$) 108, 120. The first 106 and second 108, 120 optical line termination devices have first and second fiber trunk interfaces 122' and 122, respectively. The first control connection 116 comprises an external communication link 172, e.g. via a Local Area Network (LAN), between OLT$_1$ and OLT$_2$, which are positioned in different locations. This type of protection may be referred to as type B protection with dual homing.

Figure 8:
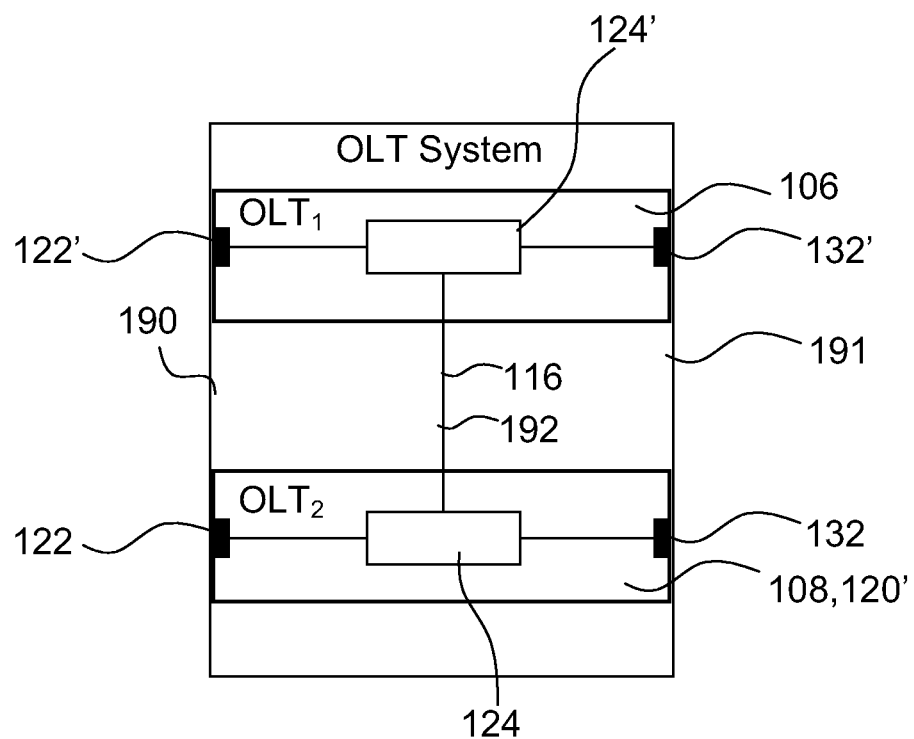

FIG. 8 illustrates an embodiment of an optical line termination system according to the invention. The optical line termination system 190 is implemented in an Application Specific Integrated Circuit (ASIC) or in a Field-Programmable Gate Array (FPGA) on a silicon board 191 and comprises a first optical line termination device (OLT$_1$) 106 and a second optical line termination device (OLT$_2$) 108, 120. The first 106 and second 108 optical line termination devices have first and second optical fiber trunk interfaces 122' and 122, respectively. OLT$_2$ is adapted to mirror network related data (GPON and service definitions) from OLT$_1$ or vice versa via first control connection 116 in the form of a bus 192 which may be important in order to perform switch over without loosing the communication sessions in the optical network system. OLT$_1$ and OLT$_2$ may have shared data storage or separate data storages as illustrated in further detail in FIGS. 5 and 6.

The optical line termination systems 150, 160, 170, 180 and 190 of FIGS. 4-8 are exemplary embodiments illustrating different ways of implementing the first optical line termination device 106 and the second optical line termination device 108, 120 and the method according to the invention. The implementation of the optical line termination system illustrated in FIGS. 4-6 and FIG. 8 may be referred to as type B protection scheme with single homing.

In an embodiment, two optical line termination systems according to the invention are implemented on the same GPON board.

Figure 9:
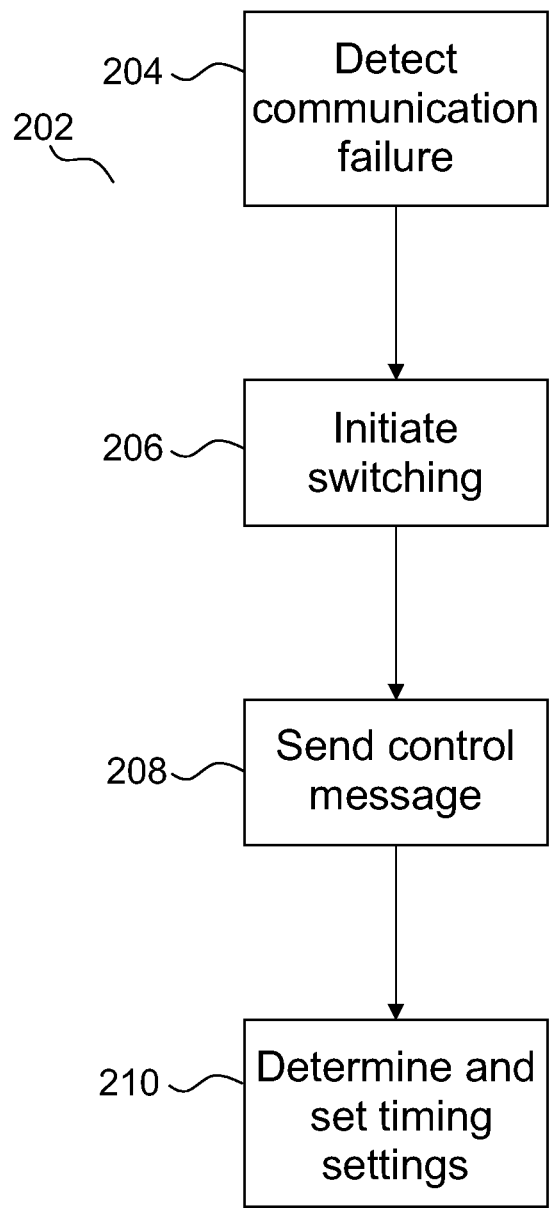

FIG. 9 is a schematic flow diagram illustrating an embodiment of the method according to the invention. The method may be implemented in a optical network system 100 illustrated in FIG. 1 or in an optical line termination system as illustrated in FIGS. 4-8. In the method 202, a communication failure between the first optical network device and the first optical line termination device is detected in step 204. Subsequently, the method proceeds to step 206 of initiating switching of functionality from the first optical line termination device to the second optical line termination device, and thereafter, in step 208, sending a control message in the form of a directed POPUP message from the second optical line termination device to the first optical network device such that the first optical network device is prevented from moving into initial state. After sending the control message in step 208, the method proceeds to step 210 of determining and setting timing settings for the first optical network device. In most cases, the round trip delay for the first line termination device and the second line termination device are different. The difference in round trip delay is caused by a difference in trunk delay d$_1$ for the first optical fiber trunk, and trunk delay d$_2$ for the second optical fiber trunk.

In the method according to the invention, the step of sending a control message may comprise sending any control message that prevents the optical network devices, such as optical network units or optical network terminations, to move into initial state. Preferably, the step of sending a control message comprises sending one or more directed POPUP messages. In a GPON, it is important that the directed POPUP message(s) reaches the optical network device(s) before they move into initial state, i.e. before timer T2 expiry (100 ms).

The change in delay is important, since ONUs need to time their upstream bursts in such a way that all burst are received aligned at the OLT without temporal overlap (no collision). The OLTs are granting timeslots for upstream transmission to the ONUs. In case OLT$_2$ takes over, the only thing that changes is the fiber trunk delay. In case the equalization delay EqD$_1$(n) for OLT$_1$ is replaced by the equalization delay EqD$_2$(n) for OLT$_2$ in the equalization delay memory of each ONU$_n$ (n=1, 2, . . . , N), the optical network system can be brought back into operation without loosing the whole optical network configuration.

Step 210 of determining and setting timing settings will be described in more detail with reference to the embodiments of steps 208 and 210 illustrated in FIGS. 11-14.

It may be desired to avoid unnecessary switching of functionality from the first optical line termination device to the second optical line termination device, e.g. in case the loss of communication is caused by an outage or failure in the optical distribution network or other parts of the system. Accordingly, the method according to the present invention may comprise determining the cause of communication failure and initiate switching of functionality based on the determined cause of communication failure. In an embodiment, switching may be initiated according to a switching scheme, e.g. only in case of failure or breakdown of the first optical fiber trunk and/or the first optical line termination device.

In an embodiment of the present invention, initiating switching of functionality comprises exchanging information between the first optical line termination device and the second optical line termination device on a first control connection, e.g. via a first interface in each of the optical line termination devices. Information between the first optical line termination device and the second optical line termination device may be exchanged on a second control connection in case of failure of the first control connection, i.e. the control connection may be duplex. The information may comprise timing settings, such as equalization delays and/or round trip delays for optical network devices connected to the first and second optical line termination device.

In case of communication failure the optical network devices stop transmitting data. In order for securing silence from ONU$_n$ for all n=1, . . . , N, the method may comprise sending a HALT message to all optical network devices connected to the first and second optical line termination devices except the one that has received directed POPUP message, e.g. the first optical network device.

In an embodiment of the method according to the invention, the step of determining and setting timing settings for the first optical network device comprises sending a ranging request message to the first optical network device and receiving a ranging response message from the first optical network device.

Alternatively or in combination, the step of determining and setting timing settings for the first optical network device comprises retrieving the timing settings from a data storage, e.g. equalization delay(s) and/or round trip delay(s) between the first optical network device and the first optical line termination device.

The step of determining and setting timing settings for the first optical network device may comprise sending a ranging time message, e.g. a directed or a broadcast ranging time message.

The optical network system may comprise a second optical network device communicating with the first optical line termination device and the second optical line termination device via the optical distribution network and the first and second optical fiber trunks, respectively. In that case, the method may further comprise sending a control message from the second optical line termination device to the second optical network device such that the second network device is prevented from moving into initial state, and determining and setting timing settings for the second optical network device.

The timing settings for the optical network devices, e.g. the equalization delay settings for the optical network devices connected to the first and second line termination devices, are often dependent on which optical line termination device is in operation, i.e. a first set of timing settings applies to the optical network devices when the first optical line termination device is in control and a second set of timing settings applies to the optical network devices when the second optical line termination device is in control.

In case the second optical line termination device takes over, the timing settings of the optical network devices must be adjusted to the new operation scheme. The timing settings, e.g. the second set of timing settings, may be determined by sending, e.g. from the second optical line termination device, a ranging request message to one or more selected optical network devices, e.g. the first and/or the second optical network device, and receiving a ranging response message from the selected optical network device(s), e.g. the first and/or the second optical network device. In an embodiment of the present invention, the ranging request message is sent to each of the optical network devices connected to the second optical line termination device.

In an embodiment of the present invention, the second set of timing settings for the optical network devices, including timing settings, e.g. equalization delay, for the first and/or second optical network device, may be partly or fully retrieved from a data storage. Alternatively or in combination, the timing settings or a part of the timing settings may be calculated, e.g. timing settings for an optical network device may be measured and the new (second set of) timing settings for the remaining optical network devices may be calculated based on the performed measurement and the first set of timing settings, which may be retrieved from a memory, e.g. in the second line termination device.

The timing settings may be set by sending a ranging time message. The ranging time message may be a broadcast ranging time message comprising a list of timing settings for the optical network devices.

Figure 10:
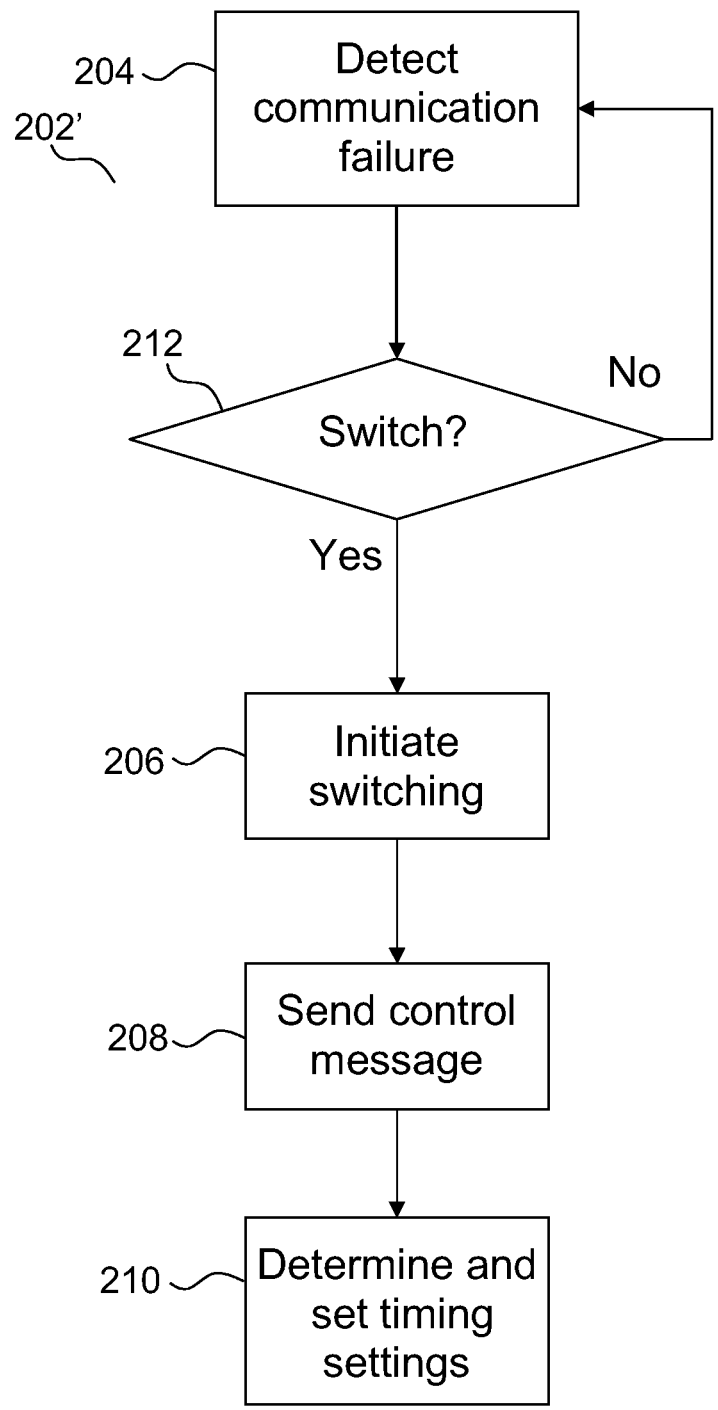

FIG. 10 is a schematic flow diagram illustrating an embodiment of the method according to the invention. The method 202' may be implemented in a optical network system 100 illustrated in FIG. 1. In addition to the steps 204, 206, 208 and 210 which are described in connection with FIG. 9, the method 202' comprises the step 212 of determining, after step 204 of detecting communication failure, if switching is to be initiated. The decision in step 212 comprises determining the cause of communication failure, i.e. whether $OLT_1$ or the first optical fiber trunk has failed. In case $OLT_1$ or the first optical fiber trunk has failed, the method 202' proceeds to step 206.

Figure 11:
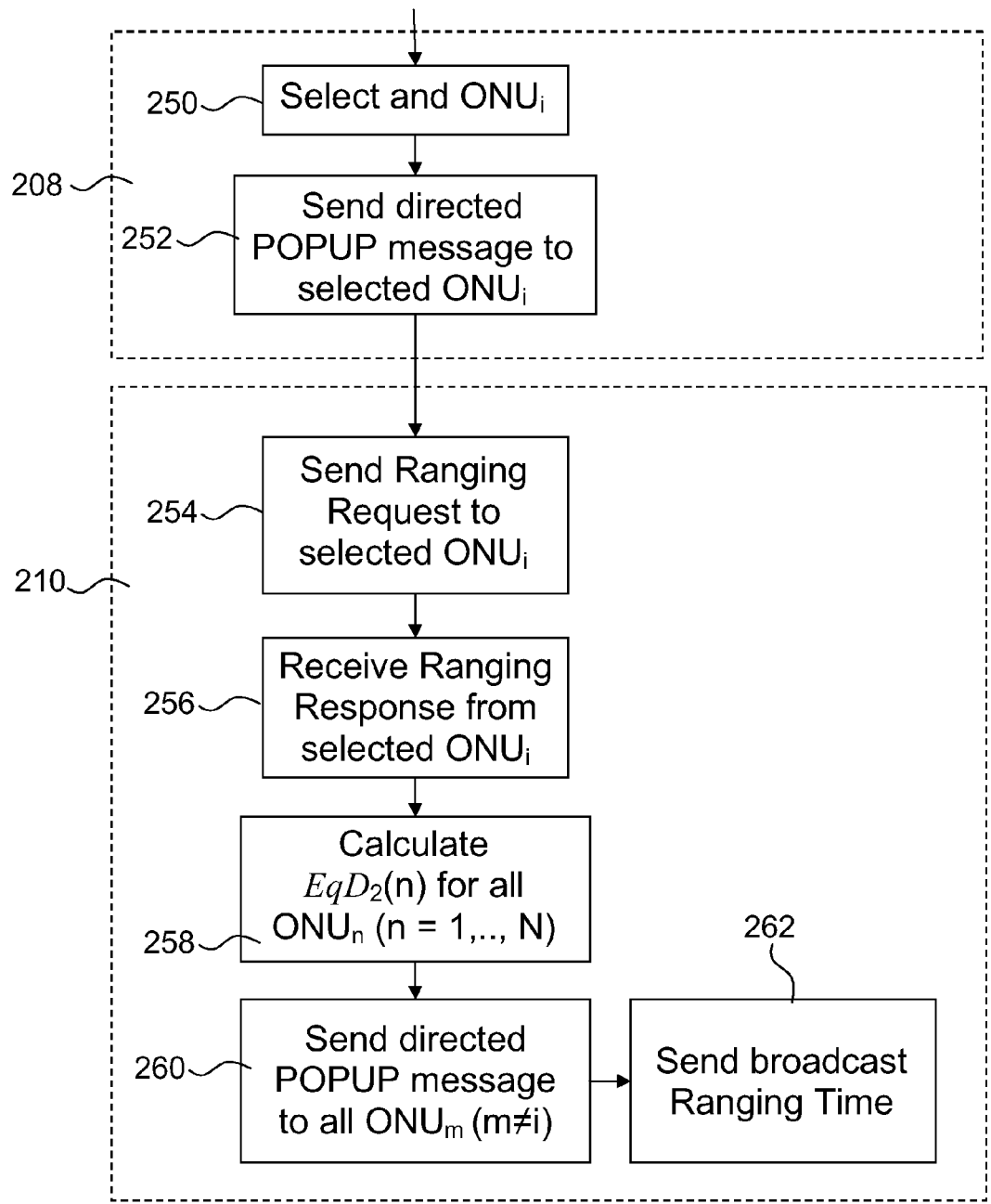

FIG. 11 schematically illustrates a flow diagram of exemplary embodiments of steps 208 and 210 of the method according to the invention, e.g. the methods illustrated in FIGS. 9 and 10. The step 208 of sending a control message to the first optical network device comprises step 250 of selecting an optical network device $ONU_i$ between the N ONUs. Further, step 208 comprises step 252 of sending a directed POPUP message to the selected optical network device $ONU_i$. In an embodiment optical, network device $ONU_1$ is selected as default. The directed POPUP message is sent from the second optical line termination device via the second optical fiber trunk to the selected optical network device $ONU_i$. In the illustrated embodiment, step 210 of determining and setting timing settings comprises ranging the selected $ONU_i$, i.e. measuring round trip delay, and calculating the equalization delay for all $ONU_n$ (n=1, . . . , N) based on the performed ranging. Step 210 comprises step 254 of sending a ranging request message to the selected optical network device. In step 256, the second optical line termination device, e.g. the second optical line termination device 108, 120, 120', receives the ranging response message from the selected optical network device, thereby measuring the round trip delay $RTD_2(i)$ between the selected optical network device and the second optical line termination device. After step 256, the equalization delay $EqD_2(i)$ for the first optical network device is calculated in step 258. Further, step 258 comprises calculating the remaining equalization delays, i.e. the equalization delays $EqD_2(n)$ for all $ONU_n$ (n=1, . . . , N) are calculated. The equalization delays $EqD_2(n)$ for all $ONU_n$ (n=1, . . . , N) are given by $$EqD_2(n)=EqD_1(n)+\Delta d,$$

where $\Delta d$ is the difference between the trunk delay $d_2$ for the second optical fiber trunk and the trunk delay $d_1$ for the first optical fiber trunk and given by:

$$\Delta d=d_2-d_1=RTD_2(i)-RTD_1(i),$$

where $RTD_2(i)$ is the measured round trip delay for the selected optical network device $ONU_i$ and $RTD_1(i)$ is the round trip delay between the first optical line termination device and the selected optical network device $ONU_i$. Delays apart from $d_2$ and $d_1$ have not changed. $RTD_1(i)$ and/or $EqD_1(n)$ may be retrieved from a memory in the second optical line termination device, e.g. memory 128.

Upon determining the timing settings, the method proceeds to step 260 of sending directed POPUP messages to all $ONU_m$ (m≠i). It is important that all optical network units receive the directed POPUP message before expiry of POPUP state timer (T2 (100 ms) for GPON according to ITU-T G.984.3 Amendment 1 (July 2005)), whereby the optical network units are prevented from moving into initial state and instead move back to operation state. After step 260, the method proceeds to step 262 of setting the new timing settings, e.g. as illustrated by sending a Ranging Time message. The Ranging Time message may be a broadcast Ranging Time message that is sent to all $ONU_n$ (n=1, . . . , N) with a list of the new equalization delays $EqD_2(n)$ for each optical network device $ONU_n$. Step 262 may comprise sending N Ranging Time messages, one for each optical network device. When the Ranging Time message is received, the optical network devices is brought back to operation state and communication is again established.

In an embodiment of the method illustrated in FIG. 11, steps 250 and 252 may be replaced by the step of sending a broadcast POPUP message, and step 260 may be omitted such that step 262 follows upon step 258.

It is an advantage of the method partly illustrated in FIG. 11 that the determination of the new equalization delays is performed on the basis of one round trip measurement, thereby saving N−1 round trip measurements.

The method according to the invention may be performed within 50 milliseconds thus securing session continuity. Recovering may in an embodiment be performed within 10 milliseconds, such as within 2 milliseconds.

Figure 12:
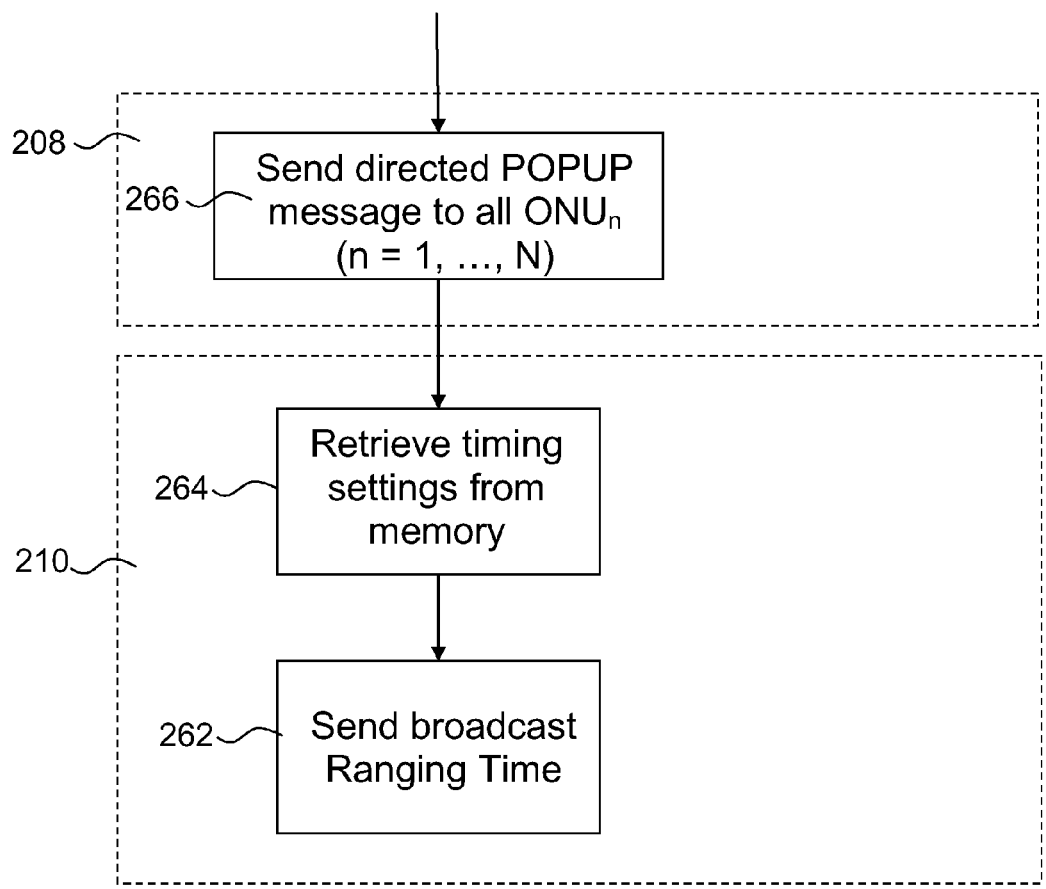

FIG. 12 schematically illustrates a flow diagram of exemplary embodiments of steps 208 and 210 of the method according to the invention, e.g. the methods illustrated in FIGS. 9 and 10. In the embodiment illustrated in FIG. 12, step 208 comprises step 266, wherein the second optical line termination sends a directed POPUP message to all optical network devices $ONU_n$ (n=1, . . . , N). Subsequently, the method proceeds to step 210 comprising the step 264 of retrieving the second set of equalization delays $EqD_2(n)$ for each optical network device $ONU_n$ from a memory, e.g. memory 128 and finally proceeding to step 262 which is described in more detail above.

In an embodiment of the method illustrated in FIG. 12, step 266 may be replaced by the step of sending a broadcast POPUP message.

Figure 13:
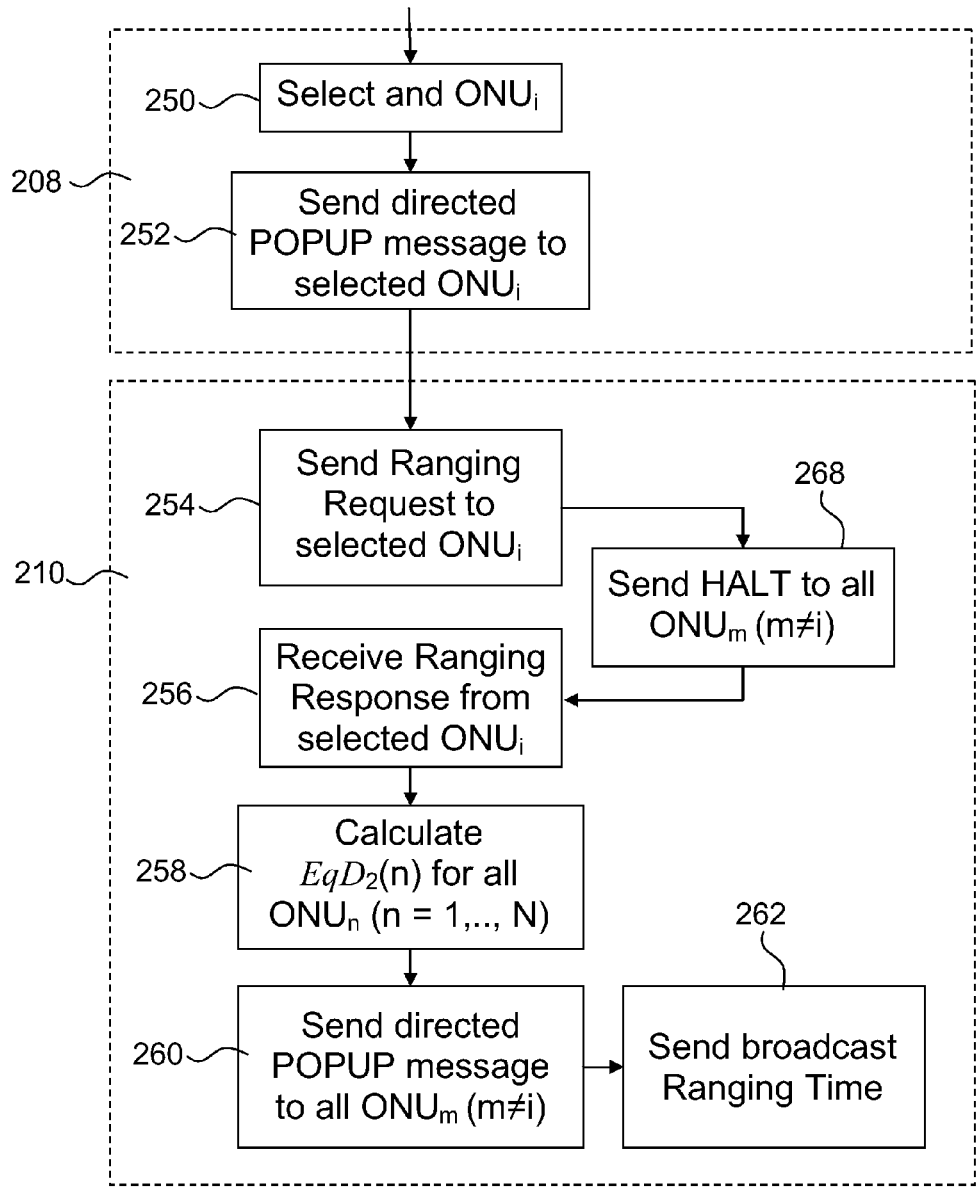
Figure 14:
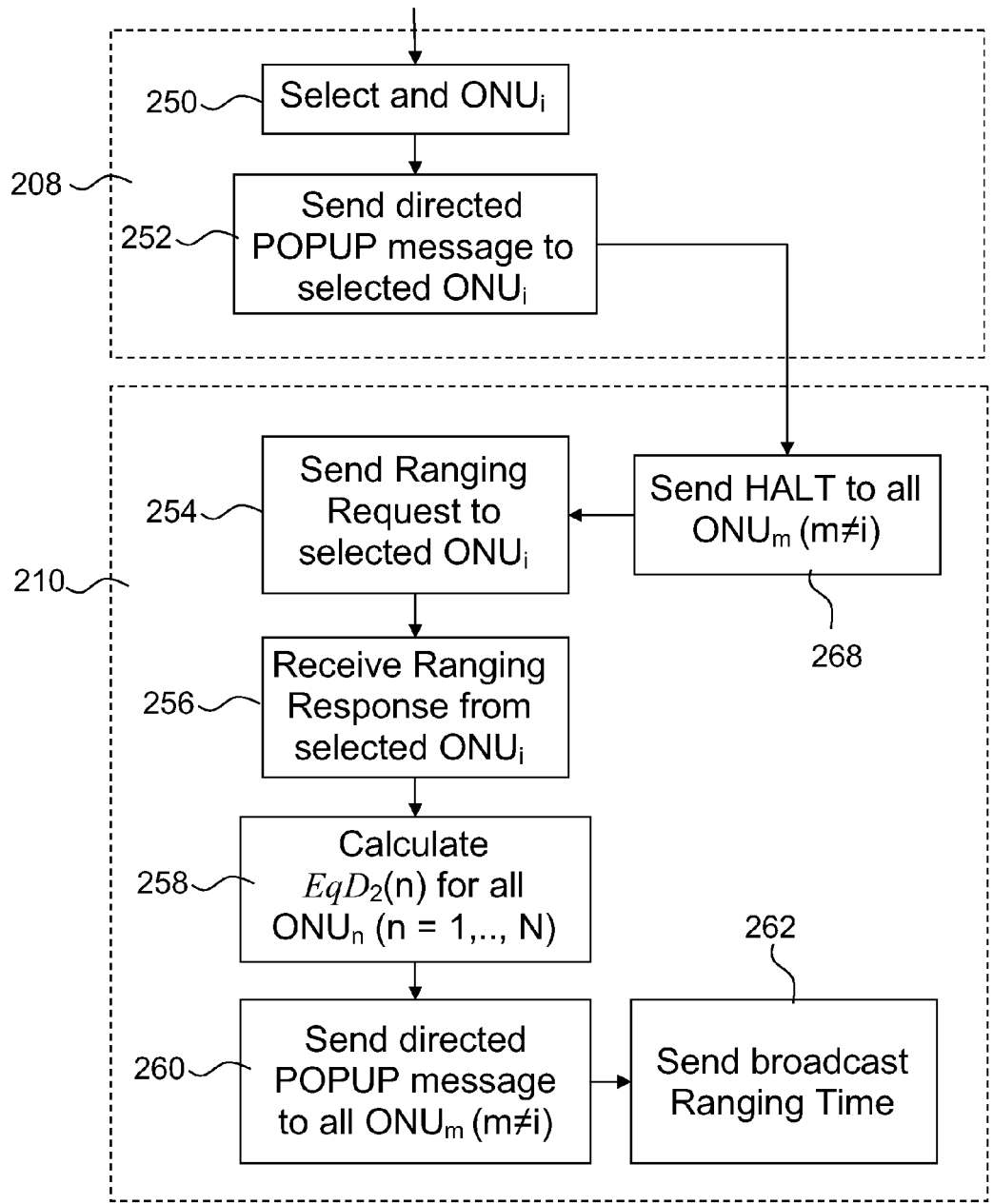

FIGS. 13 and 14 show embodiments similar to the one illustrated in FIG. 11. The methods illustrated in FIGS. 13 and 14 further comprise the step 268 of sending a HALT message to all $ONU_m$ (m≠i) in order to ensure upstream silence on all $ONU_m$ (m≠i), thereby enabling round trip delay measurement.

The method, device and system according to the invention may be implemented in any Passive Optical Network (PON), in particular in a Gigabit-capable Passive Optical Network (GPON), e.g. as described in G.984.1-3, or in an Ethernet Passive Optical Network (EPON), e.g. as described in IEEE 892.3ah.

It should be noted that in addition to the exemplary embodiments of the invention shown in the accompanying drawings, the invention may be embodied in different forms and should not be construed as limited to the embodiments set forth herein. Rather, the embodiments illustrated herein are provided so that this disclosure will be thorough and complete, and will fully convey the concept of the invention to those skilled in the art.

The invention claimed is:

1. A method for protecting an optical network system comprising a first optical network device, an optical distribution network, and a first and second optical line termination device, the first optical network device communicating with the first optical line termination device on a first connection via the optical distribution network and a first optical fiber trunk connected to the first optical line termination device, and the first optical network device having a second connection to the second optical line termination device via the optical distribution network and a second optical fiber trunk connected to the second optical line termination device, wherein the optical network system further comprises a second optical network device communicating with the first optical line termination device and the second optical line termination device via the optical distribution network and the first and second optical fiber trunk, respectively, wherein the method comprises the steps of:
   detecting communication failure between the first optical network device and the first optical line termination device;
   initiating switching of functionality from the first optical line termination device to the second optical line termination device;
   sending a control message from the second optical line termination device to the first optical network device such that the first optical network device is prevented from moving into initial state;
   determining and setting timing settings for the first optical network device;
   sending a control message from the second optical line termination device to the second optical network device such that the second optical network device is prevented from moving into initial state; and
   determining and setting timing settings for the second optical network device, wherein the step of determining and setting timing settings for the second optical network device comprises calculating the timing settings based on measured timing settings for the first optical network device.

2. The method according to claim 1, further comprising the step of determining the cause of communication failure and initiate switching of functionality based on the determined cause of communication failure.

3. The method according to claim 1, wherein the step of initiating switching of functionality comprises exchanging information between the first optical line termination device and the second optical line termination device on a first control connection.

4. The method according to claim 3, wherein information between the first optical line termination device and the second optical line termination device is exchanged on a second control connection in case of failure of the first control connection.

5. The method according to claim 1, wherein the step of sending a control message comprises sending a directed POPUP message to the first optical network device.

6. The method according to claim 1, further comprising the step of sending a HALT message to other optical network devices connected to the first and second optical line termination devices.

7. The method according to claim 1, wherein the step of determining and setting timing settings for the first optical network device comprises sending a ranging request message to the first optical network device and receiving a ranging response message from the first optical network device.

8. The method according to claim 1, wherein the step of determining and setting timing settings for the first optical network device comprises retrieving the timing settings from a data storage.

9. The method according to claim 1, wherein the step of determining and setting timing settings for the first optical network device comprises sending a ranging time message.

10. The method according to claim 1, wherein the step of sending a control message to the second optical network device, comprises sending a directed POPUP message to the second optical network device.

11. The method according to claim 1, wherein the step of determining and setting timing settings for the second optical network device comprises sending a ranging request message to the second optical network device and receiving a ranging response message.

12. The method according to claim 1, wherein the step of determining and setting timing settings for the second optical network device comprises retrieving timing settings from a data storage.

13. The method according to claim 1, wherein the step of determining and setting timing settings for the second optical network device comprises sending a ranging time message.

14. The method according to claim 1, wherein the timing settings comprise equalization delay settings.

15. An optical line termination device for an optical network system comprising a first optical network device and an optical distribution network, the optical line termination device comprising a fiber trunk interface and being adapted to communicate with the first optical network device on a connection via the optical distribution network and a first optical fiber trunk, the optical line termination device further comprising a processor device connected to the fiber trunk interface and being adapted to:
  detect communication failure between the first optical network device and another optical line termination device;
  initiate switching of functionality from the other optical line termination device to the optical line termination device;
  send a control message to the first optical network device such that the first optical network device is prevented from moving into initial state;
  determine and set timing settings for the first optical network device;
  send a control message to a second optical network device communicating with the optical line termination device and the other optical line termination device via the optical distribution network and the first and a second optical fiber trunk, respectively, in the optical network system; and
  determine and set timing settings for the second optical network device by calculating the timing settings based on measured timing settings for the first optical network device.

16. The optical line termination device according to claim 15, the optical line termination device being adapted to determine the cause of communication failure and initiate switching of functionality from the other optical line termination device based on the determined cause of communication failure.

17. The optical line termination device according to claim 15, further comprising a first interface to the other optical line termination device, the first interface being connected to the processor device, and wherein the optical line termination device is adapted to exchange information with another optical line termination device via the first interface on a first control connection.

18. The optical line termination device according to claim 17, wherein the optical line termination device comprises a second interface to the other optical line termination device and is adapted to exchange information with the other optical line termination device via the second interface on a second control connection in case of failure of the first control connection.

19. The optical line termination device according to claim 15, wherein the control message to the first optical network device comprises a directed POPUP message.

20. The optical line termination device according to claim 15, wherein the optical line termination device is adapted to send a HALT message to other optical network devices connected to the first and second optical line termination devices.

21. The optical line termination device according to claim 15, wherein the optical line termination device is adapted to send a ranging request message to the first optical network device and is adapted to receive a ranging response message from the first optical network device.

22. The optical line termination device according to claim 15, wherein the processor device comprises a data storage and being adapted to retrieve timing data, such as timing, settings from the data storage.

23. The optical line termination device according to claim 15, wherein the optical line termination device is adapted to send a ranging time message.

24. The optical line termination device according to claim 15, wherein the optical line termination device is adapted to send a directed POPUP message to the second optical network device.

25. The optical line termination device according to claim 15, wherein the optical line termination device is adapted to send a ranging request message to the second optical network device and receive a ranging response message from the second optical network device.

26. The optical line termination device according to claim 15, wherein the optical line termination device is adapted to retrieve timing settings for the second optical network device from a data storage.

27. The optical line termination device according to claim 15, wherein the optical line termination device is adapted to calculate the timing settings for the second optical network device based on measured timing settings for the first optical network device.

28. The optical line termination device according to claim 15, wherein the optical line termination device is adapted to send a ranging time message to the second optical network device.

29. The optical line termination device according to claim 15, wherein the timing settings comprise equalization delay settings.

30. An optical line termination system comprising a first optical line termination device and a second optical line termination device, wherein the second optical line termination device is an optical line termination device according to claim 15.

31. An optical line termination system comprising a first optical line termination device and a second optical line termination device, the first optical line termination device comprising a first fiber trunk interface and a first core interface, and the second optical line termination device comprising a second fiber trunk interface and a second core interface, the second optical line termination device further comprising a second processor device connected to the first fiber trunk interface and being adapted to:
  detect communication failure between a first optical network device and the first optical line termination device;
  initiate switching of functionality from the first optical line termination device to the second optical line termination device;
  send a control message to the first optical network device such that the first optical network device is prevented from moving into initial state;
  determine and set timing settings for the first optical network device;
  send a control message from the second optical line termination device to a second optical network device such that the second optical network device is prevented from moving into initial state, wherein the second optical network device is communicating with the first optical line termination device and the second optical line termination device via an optical distribution network and the first and second optical fiber trunk interfaces, respectively, and
  determine and set timing settings for the second optical network device by calculating the timing settings based on measured timing settings for the first optical network device.

32. The optical line termination system according to claim 31, further comprising a shared memory for a first processor device of the first optical line termination device and the second processor device, the shared memory adapted for storage of timing data.

33. The optical line termination system according to claim 31, wherein the first optical line termination device further comprises a first processor device having a first memory adapted for timing data, and the second processor device comprises a second memory adapted to hold timing data, including first timing settings.

* * * * *